Jan. 15, 1963  R. D. WIGHT  3,073,631
STEERING COLUMN ATTACHMENT
Filed June 15, 1961

INVENTOR.
BY Robert D. Wight
Bryce Beecher
ATTORNEY

United States Patent Office 3,073,631
Patented Jan. 15, 1963

3,073,631
STEERING COLUMN ATTACHMENT
Robert D. Wight, Saginaw, Mich., assignor to General Motors Corporation, Detroit, Mich., a corporation of Delaware
Filed June 15, 1961, Ser. No. 117,452
2 Claims. (Cl. 287—20)

This invention relates to an assembly incorporating a steering shaft jacket and a housing for a bearing or other part, e.g., a signal switch cancelling plate or the like.

Heretofore it has been the practice to effect attachment of such housing to the steering shaft jacket or column by means of a lock plate which is either welded to the jacket or secured thereto through a tang and slot connection. This lock plate included threaded holes which received screws inserted through the housing.

The present invention has as its principal object to dispense with the described lock plate thereby to achieve material and assembly cost advantages.

In accordance with the invention, the two parts are secured together through the use of screws which are adapted to self-tap into axial slots formed in the jacket. These screws are passed through holes in the housing, the walls of the holes being slotted to accommodate the circular end of the jacket. The latter slots are formed on the same radius of curvature as the jacket, so that the walls of the slots operate to prevent spreading of the axial slots in the jacket during the tapping-in of the screws.

The invention will be described with reference to the accompanying drawings illustrating a preferred embodiment thereof. In the drawings.

Figure 1:
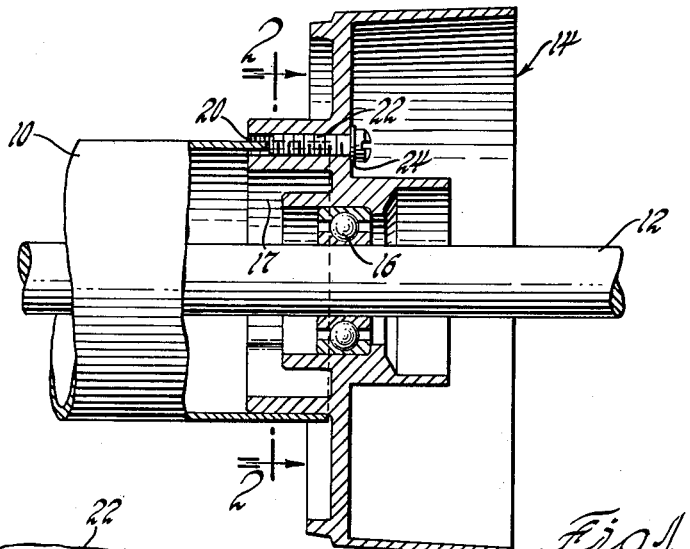
FIGURE 1 is a fragmentary side elevation with parts shown broken away or in section.

Referring first to FIGURE 1, the numeral 10 denotes the jacket for the steering shaft 12. As shown, jacket 10 terminates in a housing 14 for a bearing 16.

Figure 2:
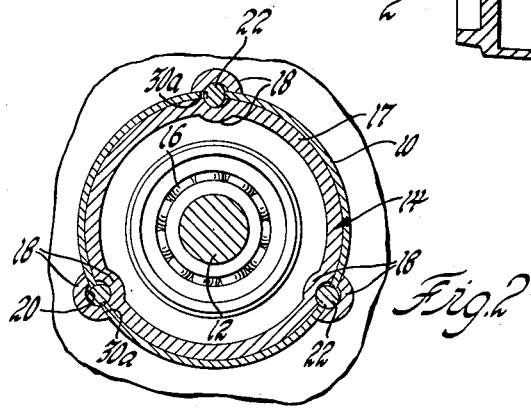
FIGURE 2 is a section on the line 2—2 in FIGURE 1.

The housing 14 is formed with an annular protuberance 17 over which the end of the jacket 10 fits. This protuberance carries a plurality of circumferentially spaced bosses 18 (FIGURE 2) shown integral with the protuberance and the body of the housing. Such bosses are provided with holes 20 for the accommodation of self-tapping screws 22 made secure by lock washers 24 (FIGURE 1).

Figure 3:
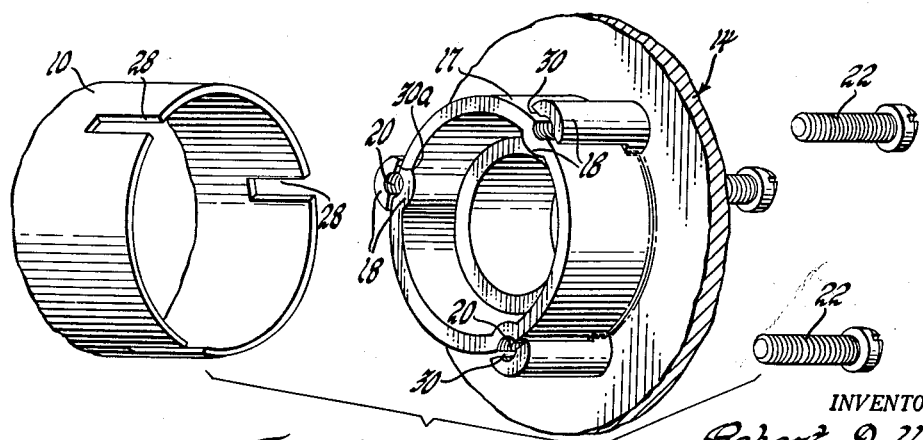
FIGURE 3 is an exploded perspective view illustrating the connection between the two principal parts.

Screws 22 make their taps in the opposed walls of axial slots 28 formed in the jacket 10 (FIGURE 3). Bosses 18, as illustrated, are slotted at 30 for the accommodation of the circular end of the jacket. These slots 30 are formed on the same radius of curvature as the jacket. Hence, during tapping-in of the screws the walls 30a serve to prevent spreading of the axial slots 28 with loss of the threaded connection.

On the foregoing it should be clear that the invention answers fully to its stated object in that it makes unnecessary the imposition of a lock plate or any similar part between the end of the jacket and the bearing housing.

What is claimed is:

1. In a steering column assembly, a steering shaft, a tubular jacket encasing said shaft, a housing member at one end of said jacket having an annular portion extending in the direction of said jacket provided with circumferentially spaced slotted boss means, the said end of said jacket being fitted into the slots in said boss means and itself being slotted at circumferentially spaced points registering with said boss means, and screw means threaded into said bosses and engaging the side walls of the slots in said jacket.

2. In a steering column assembly, a steering shaft, a tubular jacket encasing said shaft, and a housing member connected to said jacket at one end thereof and accommodating a bearing for said shaft, said housing having an annular portion extending into said jacket provided with a plurality of circumferentially spaced bosses, each such boss being slotted and being tapped for the reception of a screw, the said end of said jacket being fitted into said slots and itself having a plurality of slots therein circumferentially spaced as said bosses and in registry therewith, the side walls of said last-mentioned slots being tapped by the threading-in of said screws.

References Cited in the file of this patent
UNITED STATES PATENTS
2,611,632    Harris _____ Sept. 22, 1952